United States Patent
Stelzer

[15] 3,706,477
[45] Dec. 19, 1972

[54] PROPORTIONING DEVICE
[72] Inventor: William Stelzer, Milford, Mich.
[73] Assignee: Kelsey-Hayes Company, Romulus, Mich.
[22] Filed: Sept. 2, 1970
[21] Appl. No.: 68,896

[52] U.S. Cl............303/6 C, 137/493.3, 137/505.25, 188/349
[51] Int. Cl. ............................B60t 8/26, B60t 11/34
[58] Field of Search............137/493.3, 493.6, 505.25; 60/545 E; 303/6 C, 22 R, 22 A; 188/349

[56] References Cited

UNITED STATES PATENTS

| 3,547,498 | 12/1970 | Bueler | 303/6 C |
| 3,508,792 | 4/1970 | Bueler | 303/6 C |
| 3,493,270 | 2/1970 | Doerfler | 303/6 C |
| 3,385,637 | 5/1968 | Kersting | 303/6 C |

*Primary Examiner*—Milton Buchler
*Assistant Examiner*—John J. McLaughlin
*Attorney*—Harness, Dickey & Pierce

[57] ABSTRACT

A device for varying the proportion of brake pressure delivered to the front and rear brakes of a vehicle having a differential area piston for decreasing the proportion delivered to the rear brake after a certain inlet pressure is reached and an additional member which is movable to establish a fixed offset between the pressures delivered to the front and rear brakes after a certain differential between front and rear brake pressures is reached.

14 Claims, 3 Drawing Figures

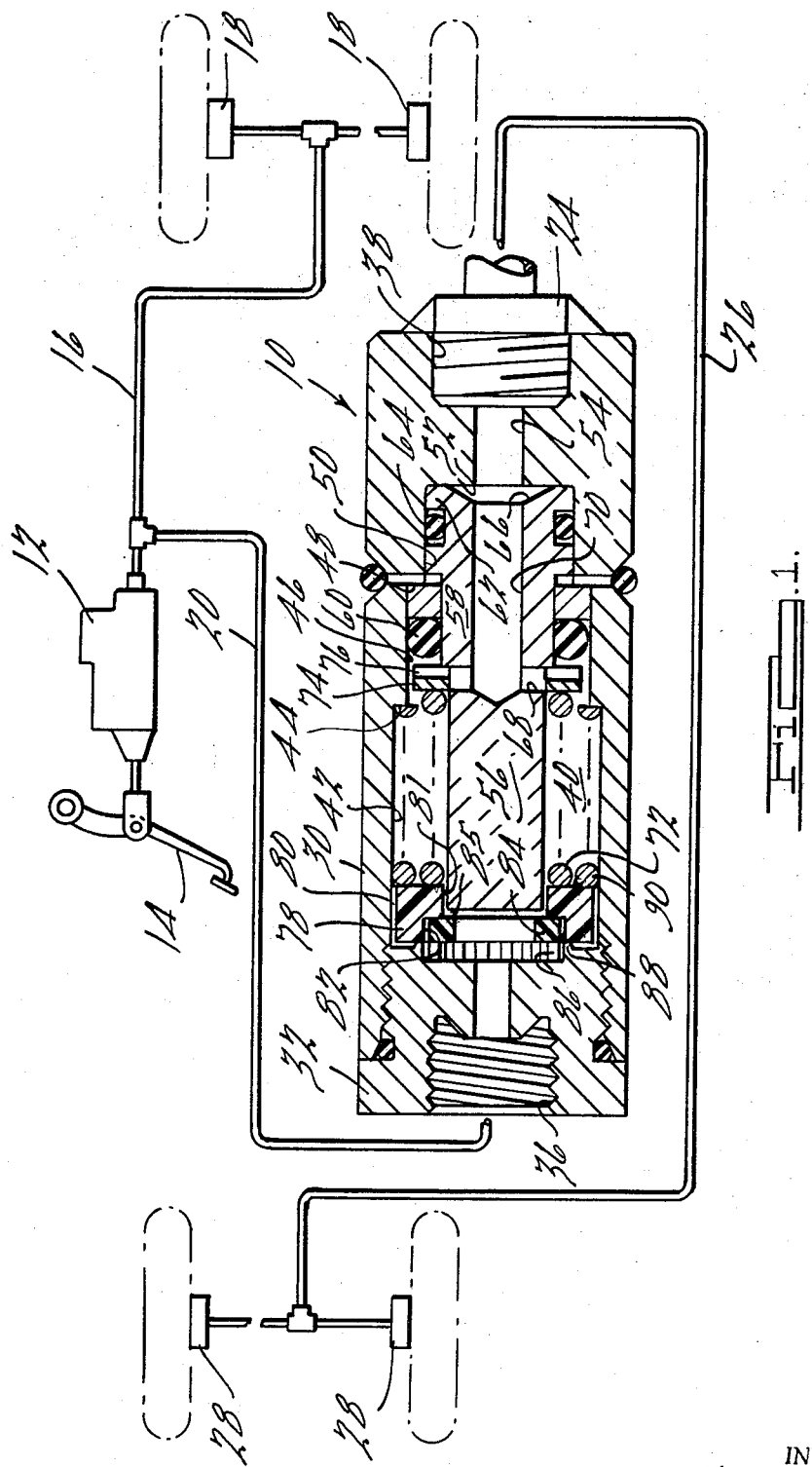

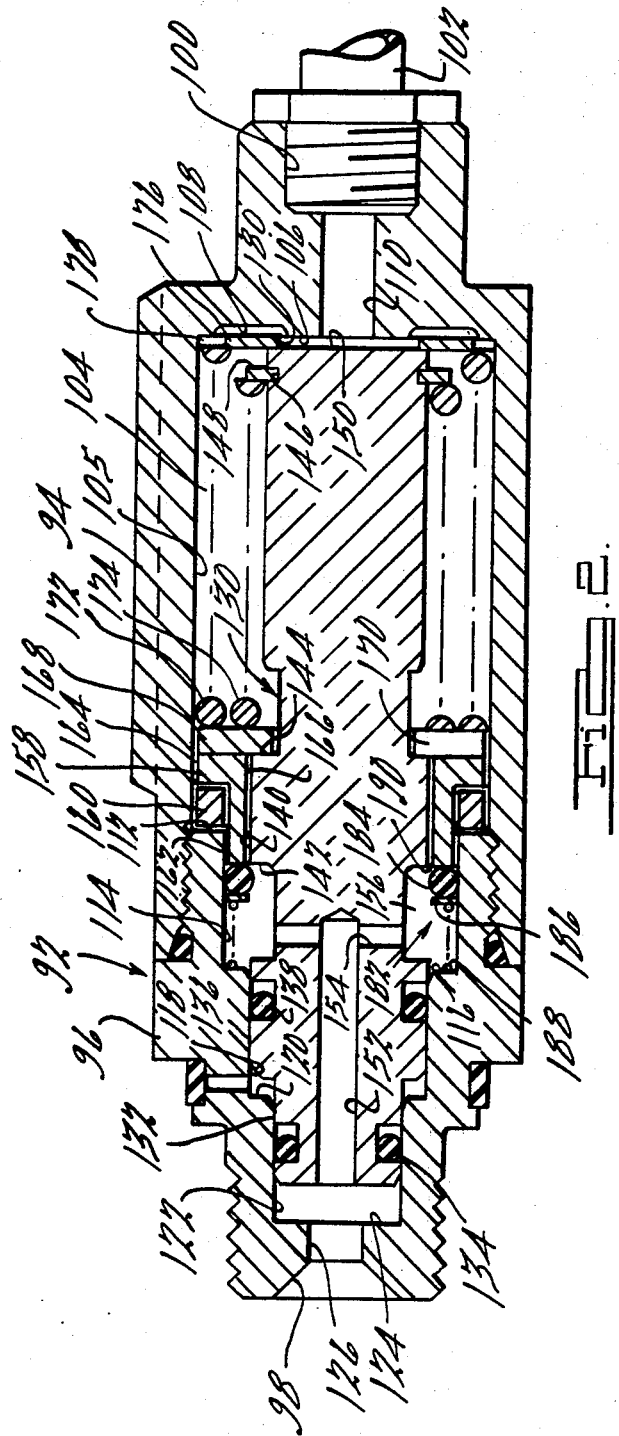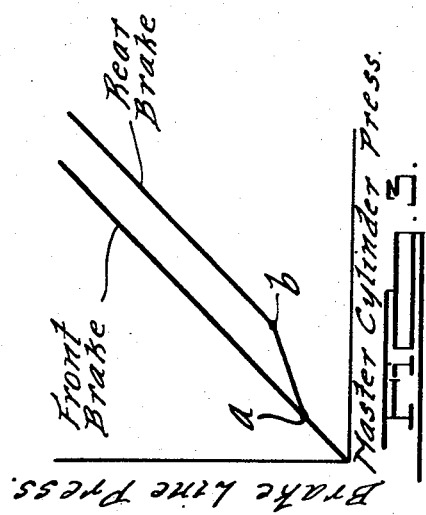

PROPORTIONING DEVICE

CROSS REFERENCE TO RELATED APPLICATIONS

The present invention relates generally to the invention disclosed in the application by David T. Ayers, entitled, PROPORTIONING DEVICE, Ser. No. 66,250 filed Aug. 24, 1970; and my application entitled, PROPORTIONING DEVICE, Ser. No. 68,895 filed Sept. 2, 1970, both of which are assigned to the assignee of this invention.

BACKGROUND OF THE INVENTION

1. Field of the Invention

Proportioning devices for vehicle hydraulic brake systems.

2. Description of the Prior Art

It is well known that the proportion of a vehicle's weight that is borne by the front and rear wheels of the vehicle does not remain static. As the vehicle is braked, the weight borne by the rear wheels decreases and the weight borne by the front wheels increases. The change in weight is dependent upon the magnitude of the deceleration. In recognition of this fact, various proportioning devices have heretofore been proposed which are responsive to master cylinder outlet pressure, and which serve to limit the brake pressure applied to the rear wheels upon the attainment of a predetermined master cylinder outlet pressure. Under certain conditions of very high master cylinder outlet pressure, for example, in the case of front brake line failure or extreme brake fade at the rear brakes, it is desirable to bypass the proportioning valve to permit the brake pressure delivered to the brakes at the rear wheels to increase at a rate higher than that ordinarily permitted by the proportioning device such that the rear brakes have adequate line pressure to stop the vehicle. This has been accomplished by a bypass valve connected in parallel with the proportioning valve which opens above a predetermined master cylinder pressure so as to circumvent the proportioning valve.

SUMMARY OF THE INVENTION

The present invention provides a proportioning device, preferably inserted between the master cylinder and the rear wheel brake cylinders, for limiting the brake pressure applied to the rear wheels above a first predetermined master cylinder outlet pressure, and additionally, for limiting the differential in the brake pressures delivered to the front and rear wheels above a second predetermined master cylinder outlet pressure. It will be appreciated that is is conventional to limit the pressure delivered to the rear wheel brake cylinder above a first rate of deceleration. To this end, a differential area piston is provided for proportioning the distribution of brake pressure delivered to the rear and front brakes from the first predetermined brake fluid inlet pressure (i.e., master cylinder outlet pressure) to a second predetermined brake fluid inlet pressure in the conventional manner. An additional increase in the fluid pressure offset between the rear and front brakes above the second predetermined brake fluid inlet pressure is prevented by providing an additional member adapted for movement at the second predetermined pressure to alter the brake pressure proportioning. Preferably, a substantially constant offset between the pressures delivered to the front and rear brakes is established above the second predetermined brake fluid inlet pressure. Therefore, it will be appreciated that above the second predetermined master cylinder outlet pressure, the pressure delivered to the rear brakes will be greater than that ordinarily provided by a proportioning device not having the additional member. In effect, the influence of the proportioning valve is lessened above the second predetermined master cylinder outlet pressure, and accordingly, a separate bypass valve in the system is not required.

More particularly, the differential area piston is resiliently biased by a prestressed spring member so that movement of the piston in response to fluid forces acting on the differential areas thereof occurs only above the first predetermined brake fluid inlet pressure. One end of the piston constitutes a valve portion which engages a cooperating valve portion upon movement of the piston to interrupt full fluid pressure communication between the inlet and the outlet of the device. Engagement and disengagement of the valve portions is effected to modulate the fluid pressure communicated to the rear brakes in the conventional manner. The additional member is also biased by a prestressed spring member for movement of the member in response to a differential pressure across the member which occurs above the second predetermined brake fluid inlet pressure.

In a first embodiment, as the second predetermined inlet pressure is reached, the differential pressure between the inlet and outlet of the proportioning device is sufficient to cause the second member to overcome the bias of the spring member so as to lift from a valve seat interposed in the device. In a second embodiment, the movement of the second member allows a following O-ring seal to move between the proportioning device housing and the piston to alter braking pressure transmitted through the proportioning device above the second predetermined inlet pressure. Movement of the member provides a fixed pressure differential across the proportioning device. Thus, above the second predetermined brake fluid inlet pressure, the fluid pressure at the outlet of the proportioning device which is delivered to the rear brakes increases substantially at the same rate as the pressure at the inlet to the proportioning device.

BRIEF DESCRIPTION OF THE DRAWINGS

FIG. 1 is a cross-sectional view of a proportioning device according to this invention illustrated with respect to a conventional vehicle hydraulic braking system;

FIG. 2 is a cross-sectional view of another embodiment of a proportioning device according to this invention; and FIG. 3 is a graph illustrating the proportioning of brake pressure to the front and rear wheels which is provided by the devices of FIGS. 1 and 2.

DETAILED DESCRIPTION OF THE PREFERRED EMBODIMENTS

In FIG. 1, the proportioning device 10 according to the present invention is shown. The proportioning device 10 is shown in its manner of connection to a hydraulic brake system for a passenger car or the like. The usual master cylinder is shown at 12 as being operated by a brake pedal 14 to deliver brake fluid directly through a conduit 16 to the front wheel brake cylinders 18. Fluid pressure is also delivered from the conduit 16 through conduits 20 and 26 to the rear wheel brake cylinders 28. The proportioning device 10 is interposed in a fluid connection to the rear brakes as between conduits 20 and 26 by means of an inlet fitting (not shown) and an outlet fitting 24. Thus, fluid pressure can only be transmitted to the rear brakes by a passage through the proportioning device 10.

The proportioning device 10 includes a hollow housing or cylinder 30 which is closed at one end by an end closure member 32 threaded to the housing 30. The proportioning device 10 has an inlet opening 36 in the end closure member 32 which is threaded to accept an inlet fitting, and an outlet opening 38 in the cylinder 30 into which the outlet fitting 24 is threaded. The housing 30 has a central bore or chamber 40 which provides communication between the inlet opening 36 and the outlet opening 38. The bore 40 is symmetrical about its longitudinal axis and is of stepped diameter to provide axially successive bore portions of decreasing cross-sectional area with shoulders formed intermediate the bore portions. These bore portions and shoulders include a bore portion 42, an annular radial shoulder 44, a bore portion 46, an annular radial shoulder 48, a bore portion 50, an annular radial shoulder 52, and a bore portion 54. A differential area member or piston 56 is carried within the bore 40 for axial reciprocatory movement and is provided with an intermediate portion 58 having an O-ring 60 sealingly engaging the wall of the bore portion 46, and an enlarged portion 62 at the right hand end thereof having an O-ring 64 sealingly engaging the wall of bore portion 50. The end of the piston 56 adjacent the outlet opening 38 has a conical outlet cavity or opening 66. The differential area piston 56 is provided further with a plurality of radial openings 68 communicating the chamber 40 with a central bore 70 extending from the radial passages 68 to the outlet opening 66 of the differential area piston 56. The differential area piston 56 is biased to the right against the shoulder 52 by a coiled spring member 72 which abuts against a collar member 74 carried on the piston 56 at one end and against a non-metallic, substantially rigid annular member 78, for example, of nylon, at its other end. The collar member 74 has a plurality of radial serrations 76 to permit flow of fluid from chamber 40 into the radial openings 68 of the piston 56.

The annular member 78 is journalled interiorly of the bore portion 42 for axial reciprocatory movement therein. The outer diameter of the member 78 is provided with a plurality of axial serrations 80 to permit axial flow by the member 78. The inside diameter of the member 78 is established so as to provide a clearance passage 81 between the member 78 and the differential area member 56 such that it is separate from the piston 56. Thus, the member 78 is in coaxial surrounding relationship with respect to the piston 56. The member 78 freely accepts an inside step portion 82 accepting a resilient seal 84 which includes a body portion and an integral portion having a plurality of serrations 86 which abut the end closure member 32. The serrations 86 permit communication from the inlet 36 to a raised valve seat 88 on the end closure member 32. The spacer 84 has an inside diameter which is smaller than the outside diameter on the left end portion of the piston 56 so as to act as a valve member co-operating with the left end portion of the piston 56 to interrupt pressure communication through the device 10 at a narrow passage 85 in accordance with reciprocatory movement on the piston 56. The member 78 is biased against the valve seat 88 under the influence of the first coiled spring member 72 and a second coiled spring member 90, of higher rate than the spring member 72, operating in concert therewith so as to normally block flow by the valve seat 88.

In operation, the proportioning device 10 receives the output pressure of the master cylinder 12 at its inlet opening 36. During normal operation of the brakes when the master cylinder outlet pressure is not in excess of the first predetermined amount, a fluid path for the transmission of braking fluid is provided from the inlet opening 36 into the bore 40 through the narrow passage 85 and clearance 81, and consequently, to the outlet opening 38 though the radial opening 68 and the bore 70 in the differential area member 56. Under such conditions, the proportioning device 10 has no effect upon the braking pressure delivered from the master cylinder 12 to the rear wheel brake cylinders 28. During braking, however, fluid pressure within the bore 40 acts upon the differential area piston 56, tending to move the piston 56 in a left hand direction, i.e., toward the inlet 36, against the spring 72. This action is produced by the fact that the shoulders and surface areas of the piston exposed to fluid pressure which face in a right hand direction have a greater total area than such surfaces and shoulders which face in a left hand direction. The spring 72 is precompressed such that the force tending to move the piston in the left hand direction must reach a predetermined level to overcome the spring 72. As the fluid pressure at the inlet 36 continues to increase, the piston 56 will move off the shoulder 52 and the spring 72 will be further compressed. Movement of the piston 56 toward the left results in engagement of the left end of the differential area piston 56 with the resilient seal 84 to interrupt the transmission of full braking pressure through the proportioning device 10. Accordingly, the proportion of the master cylinder brake pressure delivered to the rear wheel brake cylinders 28 is reduced. The differential area piston 56 engages and disengages the resilient seal 84 to modulate the braking pressure delivered to the rear brakes in the conventional manner until a second predetermined master cylinder pressure is reached. This operation is discussed in more specific detail in the patent to William Stelzer, U.S. Pat. No. 3,423,936, issued Jan. 28, 1969, and assigned to the assignee of this application.

When the second predetermined master cylinder is reached, a differential force on the member 78 produced by a differential pressure across the member 78 causes movement of the member 78 to the left. The differential pressure arises by virtue of the fact that the surfaces facing to the right are exposed solely to the reduced pressure at the output of the proportioning device 10, whereas a portion of the surfaces facing to the left are exposed to the higher pressure at the inlet 36 of the proportioning device 10, particularly, the portion of the member 78 radially outward of its engagement with the valve seat 88. The coiled spring members 72 and 90 are prestressed to allow movement of the member 78 to the left above the second predetermined inlet pressure to lift the member 78 from the valve seat 88. The prestress of the coiled spring member 90 is established so as to provide a substantially constant pressure offset between the braking pressures delivered to the front and rear brakes, i.e., a fixed differential pressure across the proportioning device 10 is provided above the second predetermined inlet pressure. After the pressure from the master cylinder 12 is released by the operator, the pressure at the rear wheel brake cylinders 28 is relieved by leftward deformation of the radially inward portion of the resilient seal 84 which thereby acts as a one-way valve.

The brake pressure performance of the proportioning device 10 can be more clearly seen with reference to the graph of FIG. 3. In FIG. 3, a graph of master cylinder pressure in relation to pressure delivered to the front and rear wheel brake cylinders is illustrated. As can be seen in the graph of FIG. 3, the front wheel brake cylinders receive full outlet pressure over the entire range of operation. The rear brake cylinders receive full master cylinder pressure until a first predetermined outlet pressure is reached at point a. Point a corresponds to the "split point" conventionally established using proportioning devices. At point a, a piston 56 moves to the left so as to engage the resilient seal 84 to interrupt full pressure transmission through the device 10. At second predetermined master cylinder outlet pressure b, the pressure developed across the second member 78 has become sufficiently great to lift the second member 78 from the valve seat 88 thereby opening a pressure bypass through the serrations 80, and consequently, to provide a lesser rate of diminution brake pressure delivered to the rear brakes in response to increasing fluid pressure at the inlet opening 36. Preferably, a substantially fixed pressure differential (a slope of 45°) between the pressure delivered to the front and rear wheel brake cylinders is provided above the second predetermined inlet fluid pressure.

In FIG. 2, a second embodiment of a proportioning device according to the present invention is shown. The proportioning device 92 of FIG. 2 includes a hollow housing or cylinder 94 which is closed at one end by an end closure member 96 threaded into the housing 94. The proportioning device 92 has an inlet opening 98 in the end closure member 96 which is threaded to accept an inlet fitting, and an outlet opening 100 in the housing 94 into which an outlet fitting 102 is threaded. As can be seen with reference to FIG. 1, the proportioning device 92 is adapted to be interposed between a master cylinder for a vehicle and the rear wheel brake cylinders of the vehicle.

The housing 94 has a cylindrical bore or chamber 104 which provides communication between the inlet opening 98 and the outlet opening 100. The bore 104 is symmetrical about its longitudinal axis and is of stepped diameter to provide a pair of axially successive cylindrical bore portions of decreasing cross-sectional area with a shoulder formed intermediate the bore portions. More particularly, the bore 104 includes a bore portion 105, a radial shoulder 106 having a shallow annular groove 108 therein, and an outlet bore portion 110. Similarly, the end closure member 96 is provided with axially successive cylindrical bore portions of decreasing cross-sectional area with shoulders formed intermediate the bore portions. The bore portions and shoulders of the end closure member 96 include a radial shoulder 120, a bore portion 122, a radial shoulder 124, and in inlet bore portion 126.

A differential area member 130 is carried within the bore 104 and journaled with respect to the bore portions 118 and 122 for axial reciprocatory movement therein. The differential area piston 130 is provided with a left end portion 132 having an O-ring 134 sealingly engaging the wall of bore portion 122, and a next successive portion 136 having an O-ring 138 sealingly engaging the wall of bore portion 118. The piston 130 is further provided with an enlarged intermediate cylindrical portion 140 having an annular radial shoulder 142 at the left end thereof and an annular radial shoulder 144 at the right end thereof. Near the right end of the piston 130 an annular groove 146 is provided accepting a snap ring 148 which radially projects from the piston 130. At its extreme right end, the piston 130 has a flat radial face 150 as shown. The piston 130 has a central bore 152 at the left end thereof connecting with a plurality of radial passages 154 to permit communication from the inlet opening 98 to a chamber 156 defined in part by the bore portion 114 and the shoulders 116 and 142.

The proportioning device 92 further is provided with a second member 158 of annular configuration having an L-shaped cross section. More particularly, the second member 158 has a first cylindrical portion 162 at its left end, a larger second cylindrical portion 164 at its right end, and a bore 166 extending therethrough. The second member 158 is positioned by a spacer 160 for axial reciprocatory movement therein in the bore 104. The spacer 160 has a serration on all sides thereof so as to provide a flow passage by the left and upper sides thereof, and a flow passage by the lower and right sides thereof. The spacer 160 is retained in position with respect to the housing 94 by a press fit engagement with the bore portion 105 of the housing 94. The second member 158 is sized so as to permit a flow passage between bore portion 114 and left end cylindrical portion 162 thereof and between the bore portion 105 and the right end cylindrical portion 164. The inner bore 166 of the second member 158 is slightly larger than the diameter of the piston 130 so as to permit flow therebetween.

A washer 168, abutting against the right end of the second member 158 and the shoulder 144 of the piston 130, is provided having a radial slot 170 to permit flow of fluid thereby. The washer 168 is resiliently held against the second member 158 and the shoulder 144 by engagement of end of prestressed first and second coiled spring members 172 and 174. The other end of the first coiled spring member 172 engages an end washer 176 which abuts against the shoulder 106 of the housing 94. The washer 176 has a plurality of radial slots 178, and an inner diameter 180 which is greater than the inner diameter of the annular groove 108 in the shoulder 106 to provide flow thereby. The other end of the second coiled spring member 174 abuts the snap ring 148 affixed to the piston 130 thereby resiliently biasing the piston 130 to the right against the end washer 176.

A check valve assembly 182 is provided which consists of: an O-ring 184; a washer 186 abutting the O-ring 184 at one side thereof; and a light coiled spring member 188 abutting the shoulder 116 of the end closure member 96 at one end, and the washer at its other end, so as to resiliently bias the O-ring 184 against the second member 148. As will be explained hereinafter, the O-ring 184 also serves as a valve member acting in cooperation with the shoulder 142 of the piston 130 to interrupt pressure communication from the inlet to the outlet at 190 in accordance with axial movement of the piston 130.

In operation, the proportioning device 92 receives the outlet pressure of the master cylinder at its inlet 98. During normal operation of the brakes when the master cylinder outlet pressure is not in excess of a predetermined amount, a fluid path for the transmission of braking pressure is provided from the inlet opening 98, through the inlet bore portion 126, the central passage 152 and the radial passages 154 of the piston 130, the passage 190, the annular passage between the piston 130 and the second member 158, the slot 170 in the washer 168, the radial serrations 178 in the washer 176, the annular groove 108, and the outlet bore portion 110 to the outlet opening 100. Under such conditions, the proportioning device 92 has no effect upon the braking pressure delivered from the master cylinder to the rear wheel brake cylinders. During braking, however, fluid pressure within the bore 104 acts upon the differential area piston 130, tending to move the piston 130 in the left hand direction, i.e., toward the inlet opening 98, against the spring 174. This action is produced by the fact that the shoulder and surface areas of the piston 130 exposed to the fluid pressure which face in the right hand direction have a greater total area than such shoulder surfaces which face in a left hand direction. The spring 174 is precompressed such that the force tending to move the piston in the left hand direction must reach a predetermined level to overcome the spring 174. As the fluid pressure at the inlet 98 continues to increase, the piston 130 will move off the washer 176 and the spring 174 will be further compressed. Movement of the piston 130 toward the left results in engagement of the shoulder 142 of the differential area piston 130 with the O-ring 184 to interrupt the full transmission of braking pressure through the proportioning device 92. Accordingly, the proportion of the master cylinder brake pressure delivered to the rear wheel brake cylinders is reduced. The differential area piston 130 engages and disengages the O-ring 184 to modulate the braking pressure delivered to the rear brakes in the conventional manner until a second predetermined master cylinder pressure is reached. As stated previously, this operation is discussed in more specific detail in the patent to William Stelzer, U.S. Pat. No. 3,423,936, issued Jan. 28, 1969, and assigned to the assignee of this application.

When the second predetermined master cylinder is reached, the pressure drop across the O-ring 184 and the second member 158 will cause movement of the second member 158 to the right, and following movement of the O-ring 184 to the right in the space between the cylindrical portion 140 of the piston 130 and the bore portion 114 of the end closure member 96. In this regard, the position of the O-ring 184 is controlled by the left end of the second member 158 since the fluid pressure in chamber 156 and the spring member 188 urge the O-ring 184 into engagement with the second member 158. The prestress of the coiled spring members 172 and 174 are established so as to provide a substantially constant pressure offset between the braking pressures delivered to the front and rear brakes, i.e., a fixed differential pressure across the proportioning device 92 is provided above the second predetermined inlet pressure. If extreme fluid displacement is required, the O-ring 184 will move to the right until it is approximately between the cylindrical portion 140 and the spacer 160, at which point a flow passage through the left and peripheral serrations of the spacer, the slot 170 of the washer 168, and in turn, to the outlet opening 100 through the flow path previously described. After the pressure from the master cylinder is released by the operator, the O-ring 184 moves leftward so as to establish an expanding volume which allows a reduction in pressure at the outlet opening 110. This reduction causes the pressure at the rear brake cylinders to more closely follow the plot of FIG. 3 for the rear brake pressure (shown for increasing master cylinder pressure) under a decreasing master cylinder condition. Thereafter, the pressure at the rear brake cylinders is released through the passage 190 since the spring 188 is sufficiently light to allow the reverse pressure differential to move the O-ring 184 off the shoulder 142 to open the passage 190. With reference now to FIG. 3, it can be seen that as the first predetermined master cylinder outlet pressure is reached, the proportion of braking pressure delivered to the rear brakes begins to decrease. This action is accomplished by movement of the piston 130 to the left thereby closing the passage 190. Modulation of the rear brake pressure between points a and b occurs in the conventional manner through reciprocation of the piston 130. Above second predetermined master cylinder pressure b, the O-ring 184, following the second member 158, moves into the space between cylindrical portion 140 of the piston 130 and the bore portion 114 of the end closure member 96 to provide the relationship between points a and b as shown in FIG. 3.

While it will be apparent that the teachings herein are well calculated to teach one skilled in the art the method of making the preferred embodiments of this invention, it will be appreciated that the invention is susceptible to modification, variation and change without departing from the proper scope or meaning of the subjoined claims.

What is claimed is:

1. A brake pressure control device for use in a vehicle hydraulic brake system comprising:
    a housing having fluid inlet adapted to receive fluid from a source of fluid pressure, a fluid outlet through which fluid is adapted to be displaced to a brake cylinder, and a fluid chamber for providing communication between said inlet and said outlet;
    means in said chamber for movement in response to fluid pressure at said inlet above a first predetermined pressure to decrease the transmission of fluid pressure from said inlet to said outlet;

an annular member in said fluid chamber arranged coaxially of and surrounding said means adapted for movement to provide an additional passage for transmission of said pressure from said inlet to said outlet in response to a second higher predetermined fluid pressure at said inlet for influencing the decrease in the transmission of fluid pressure provided by said device, a resilient valve member between said inlet and said outlet;

a valve portion on said means in said chamber cooperating with said resilient valve member to provide said interruption of said pressure transmission from said inlet to said outlet at said first predetermined pressure;

the position of said valve member being controlled by said first mentioned member for movement in accordance therewith at said second predetermined fluid pressure at said inlet, and movement of said resilient member in response to decreasing fluid pressure at said inlet above said second predetermined fluid pressure causing said resilient member to sealingly engage said means and a relatively fixed element in said housing to provide a reduction in pressure at said outlet.

2. A brake pressure control device according to claim 1 wherein said member is an annular member coaxially disposed with said means in said chamber.

3. A brake pressure control device according to claim 2 wherein said member surrounds said means in said chamber.

4. A brake pressure control device according to claim 1
wherein said means in said chamber has a first total area exposed to fluid pressure at said inlet and a second total area greater than said first area exposed to fluid pressure at said outlet, the ratio of said first and second total areas being established so as to provide movement of said means in response to said fluid pressure at said inlet.

5. A brake pressure control device according to Claim 4 wherein said member is adapted for movement away from said inlet in response to a pressure drop across said member.

6. A brake pressure control device for use in a vehicle hydraulic brake system comprising:
a housing having fluid inlet adapted to receive fluid from a source of fluid pressure, a fluid outlet through which fluid is adapted to be displaced to a brake cylinder, and a fluid chamber for providing communication between said inlet and said outlet;
differential area means in said chamber sealingly engaging the walls thereof and providing fluid communication from said inlet to said outlet, said differential area means being adapted for movement in response to fluid pressure at said inlet to decrease the transmission of fluid pressure from said inlet to said outlet;
resilient means for exerting a force on said differential area means for preventing movement of said differential area means and consequent decrease in the transmission of fluid pressure thereby below a first predetermined fluid pressure at said inlet and for yielding to allow movement of said differential area means to decrease the transmission of fluid pressure from said inlet to said outlet above said first predetermined fluid pressure at said inlet;

a member in said fluid chamber separate from said differential area means being adapted for a predetermined movement in response to fluid pressure at said inlet for influencing the decrease in the transmission of fluid pressure from said inlet to said outlet; and resilient means for exerting a force on said member for providing said predetermined movement of said member which influences the transmission of fluid pressure from said inlet to said outlet above a second higher predetermined pressure at said inlet, a first valve portion between said inlet and said outlet;

a second valve portion on said differential area means in said chamber engageable with said first valve portion to provide said interruption of said pressure transmission from said inlet to said outlet at said first predetermined pressure;

said first valve portion being movable at said second predetermined fluid pressure at said inlet, movement of said first valve portion in response to decreasing fluid pressure at said inlet above said second predetermined fluid pressure providing a reduction in pressure at said outlet, said first valve portion being sealingly engageable with both said second valve portion and a fixed element in said housing.

7. A brake pressure control device according to claim 6 wherein said member is an annular member coaxially disposed with said differential area means in said chamber.

8. A brake pressure control device according to claim 7 wherein said member surrounds said differential area means in said chamber.

9. A brake pressure control device according to claim 6 wherein said predetermined movement of said member provides an additional passage for transmission of said fluid pressure from said inlet to said outlet.

10. A brake pressure control device according to claim 8 further including an additional passage for pressure transmission from said inlet to said outlet and wherein said predetermined movement of said member opens said additional passage.

11. A brake pressure control device according to claim 6 further including a valve member between said inlet and said outlet, and wherein said differential area means has a valve portion cooperating with said valve member to provide said interruption of fluid pressure transmission from said inlet to said outlet.

12. A brake pressure control device according to claim 6 wherein said differential area means in said chamber has a first total area exposed to fluid pressure at said inlet and a second total area exposed to fluid pressure at said outlet, the ratio of said first and second total areas being established so as to provide movement of said means in response to said fluid pressure at said inlet.

13. A brake pressure control device according to claim 12 wherein said second total area is greater than said first total area so that said differential area means moves toward said inlet in response to said fluid pressure at said fluid inlet.

14. A brake pressure control device according to claim 13 wherein said member is adapted for movement away from said inlet in response to a pressure drop across said member.

* * * * *